(12) United States Patent
Hervieux et al.

(10) Patent No.: US 10,024,754 B2
(45) Date of Patent: Jul. 17, 2018

(54) METHOD FOR MONITORING HEALTH OF A SEAL

(71) Applicant: Goodrich Actuation Systems SAS, Buc (FR)

(72) Inventors: Arnauld Hervieux, Versailles (FR); Bastien Le Riguer, Morainvilliers (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 120 days.

(21) Appl. No.: 15/159,085

(22) Filed: May 19, 2016

(65) Prior Publication Data
US 2016/0341628 A1     Nov. 24, 2016

(30) Foreign Application Priority Data

May 22, 2015 (EP) ..................................... 15305773

(51) Int. Cl.
| | |
|---|---|
| *G01M 3/28* | (2006.01) |
| *F15B 15/14* | (2006.01) |
| *F15B 15/19* | (2006.01) |
| *F16J 15/3296* | (2016.01) |
| *F15B 19/00* | (2006.01) |

(Continued)

(52) U.S. Cl.
CPC ....... *G01M 3/2869* (2013.01); *F15B 15/1452* (2013.01); *F15B 19/005* (2013.01); *F16J 15/3296* (2013.01); *F16J 15/3492* (2013.01); *F16J 15/445* (2013.01); *F15B 2211/6336* (2013.01); *F15B 2211/864* (2013.01); *F15B 2211/865* (2013.01)

(58) Field of Classification Search
CPC ... G01M 3/2869; F16J 15/3492; F16J 15/445; F16J 15/3296; F15B 15/1452; F15B 19/005; F15B 2211/865; F15B 2211/864; F15B 2211/6336

USPC ........................................ 73/40, 47, 79.8, 7, 9
See application file for complete search history.

(56) References Cited

U.S. PATENT DOCUMENTS

| | | | |
|---|---|---|---|
| 4,559,815 A | 12/1985 | Needham | |
| 6,267,041 B1 * | 7/2001 | Skiba | F15B 11/024 91/436 |

(Continued)

FOREIGN PATENT DOCUMENTS

DE        102006030999 A1 *    1/2008    .......... F15B 15/2807

OTHER PUBLICATIONS

Extended European Search Report of the European Patent Office for International Application No. EP15305773.2, dated Dec. 7, 2015, 6 pages.

*Primary Examiner* — Peter Macchiarolo
*Assistant Examiner* — Anthony W Megna Fuentes
(74) *Attorney, Agent, or Firm* — Cantor Colburn LLP (57) ABSTRACT

There is disclosed a method of monitoring the health of an abradable seal located on a piston of an actuator, the method comprising the steps of: (i) measuring an initial velocity of said actuator piston while said actuator is maintained in a passive condition at an initial time; (ii) operating said actuator; (iii) measuring a subsequent velocity of said actuator piston while said actuator is maintained in a passive condition at a subsequent time; (iv) repeating steps (ii)-(iii) and either: recording or outputting the measured subsequent velocities over time; or determining a health status of said actuator when said subsequent velocity has increased above a predetermined amount.

14 Claims, 5 Drawing Sheets

(51) Int. Cl.
  *F16J 15/44*  (2006.01)
  *F16J 15/34*  (2006.01)

(56) References Cited

U.S. PATENT DOCUMENTS

| | | | |
|---|---|---|---|
| 2006/0054016 A1* | 3/2006 | Davies | F15B 15/1409 92/109 |
| 2006/0225515 A1* | 10/2006 | Ehrler | F04B 13/00 73/861.57 |
| 2014/0109647 A1* | 4/2014 | Faivre | B60T 8/172 73/9 |
| 2014/0150421 A1* | 6/2014 | Sears | F16J 15/00 60/591 |
| 2014/0260956 A1* | 9/2014 | Williams | F16J 1/04 92/172 |
| 2014/0260958 A1* | 9/2014 | Labrie | F04B 1/0448 92/172 |
| 2016/0169223 A1* | 6/2016 | Paul | F04B 19/006 417/53 |

* cited by examiner

METHOD FOR MONITORING HEALTH OF A SEAL

FOREIGN PRIORITY

This application claims priority to European Patent Application No. 15305773.2 filed May 22, 2015, the entire contents of which is incorporated herein by reference.

TECHNICAL FIELD

The present disclosure relates generally to a method for monitoring the health of a seal located on a piston of an actuator, for example an abradable seal.

BACKGROUND OF THE INVENTION

Seals are used in a number of applications to provide a sealing function between two moving parts. For example, a piston arrangement may include a piston that is movable within a cylinder. The piston will function to separate two chambers, wherein the volume of each chamber varies depending on the position of the piston. Typically the piston and cylinder are metallic and a seal must be provided between these two components to prevent their contact whilst sealing the chambers, so as to prevent substantial amounts of fluid transferring from one chamber to the other.

The health monitoring of such seals may carried out conventionally by replacing the seals well before the end of their potential service life. This has been done to ensure that they do not catastrophically fail suddenly during use. Methods are known for monitoring actuator health, but these typically involve manual inspection and/or are only able to detect the health of the actuator as a whole, and cannot specifically detect the health or failure of the seal that is located on the actuator piston.

It is desired to provide an improved method for monitoring the health of a seal located on an actuator piston, that is able to provide an improved indication regarding its health.

SUMMARY

The disclosure provides a method of monitoring the health of an abradable seal located on a piston of an actuator, the method comprising the steps of:
(i) measuring an initial velocity of the actuator piston while the actuator is maintained in a passive state or condition (as defined herein) at an initial time;
(ii) operating the actuator, for example in normal use to drive a component connected to the actuator;
(iii) measuring a subsequent velocity of the actuator piston while the actuator is maintained in a passive state or condition (as defined herein) at a subsequent time;
(iv) repeating steps (i)-(iii) and either:
(v) recording or outputting the measured subsequent velocities over time; or
(vi) determining a health status of the actuator or seal when the subsequent velocity has increased above a predetermined amount.

The seal may be an abradable seal, or may be any type of seal that is located on a piston that suffers from leakage flow across the seal. The seal may provide a sealing function between two chambers separated by the piston.

The step (i) and/or (iii) may comprise setting up the actuator in a passive state or condition prior to measuring the initial velocity. A passive state or condition is defined below and essentially means that the movement of the piston is caused only by the leakage flow across the seal, or at least primarily by the leakage flow across the seal. As such, detecting this movement gives a clear indication of the health of the seal, since this is the only, or at least primary variable involved.

Accordingly, the methods disclosed herein may allow the health of the seal to be monitored without manual inspection of the seal itself. Various embodiments of the present disclosure are also advantageous over conventional methods that monitor the health of a control valve, rather than specifically the seal as disclosed herein.

The actuator may comprise a control valve, for example a hydraulic control valve such as a servo valve.

The actuator may be part of an actuator assembly, wherein the actuator assembly may comprise said piston and optionally a cylinder within which the piston may move. The piston may separate two chambers, e.g. first and second chambers, that may vary in volume depending on the position of the piston. The actuator assembly may comprise an annular seal that optionally provides a sealing function to prevent substantial fluid transfer between the chambers.

The actuator assembly may comprise a hydraulic system to control the flow of fluid into the chambers. The hydraulic system may comprise said control valve, for example a servo valve, that optionally controls the flow of fluid into the chambers.

In order to extend the actuator, for example, the valve may receive hydraulic fluid from an inlet, and may pump this into the first chamber via a first line, which in turn may force hydraulic fluid out of the second chamber to an outlet via a second line and valve.

In order to retract the actuator, for example, the valve may operate in reverse by receiving hydraulic fluid from the inlet, pumping this into the second chamber, which may force hydraulic fluid out of the first chamber to the outlet via first line and valve.

The step of setting up the actuator in a passive state or condition may comprise setting the control valve into its null position such that there is no flow of fluid into or out of the actuator. In the passive state or condition movement of the piston may be primarily caused, or only caused by flow of fluid across the seal.

The step of setting up the actuator in a passive state or condition may comprise moving the piston to its maximum or minimum extension.

Measuring the initial or subsequent velocity may comprise the steps of:
(a) moving the piston to a first position, for example its maximum or minimum extension;
(b) setting up the actuator in a passive state or condition (as defined herein);
(c) measuring the distance moved by the piston in a given time; and
(d) calculating the initial or subsequent piston velocity using the measured distance divided by the given time.

The movement described in step (c) may be primarily caused, or only caused by flow of fluid across the seal.

Measuring the initial or subsequent velocity may further comprise the step of:
(e) releasing the actuator from its passive state or condition, for example prior to the step (ii) of operating the actuator as described above.

The actuator may be a hydraulic actuator and may comprise a control valve arranged and adapted to control the distribution of hydraulic fluid in the actuator. The passive condition may be defined as operation of the actuator with the control valve set in a passive, or null condition such that hydraulic fluid is not introduced into the actuator.

The step of determining a health status of the actuator may comprise determining that internal leakage has increased above a critical amount based on the increase in the velocity of the piston. The step of determining a health status of the actuator may comprise determining that the sudden increase in internal leakage has occurred on the basis of a sudden increase in piston velocity.

The seal may comprise an outer ring arrangement and an energiser for urging the outer ring arrangement against an opposing surface, wherein an outermost surface of the outer ring arrangement defines a sealing surface of the seal.

The outer ring arrangement may be configured such that after a first period of operation the sealing surface suddenly transitions from having a relatively large surface area to having a relatively small surface area, so as to cause a sudden increase in internal leakage across the seal at the transition. The sudden increase in internal leakage may lead to a sudden increase in piston velocity when it is set up in its passive state or condition.

The method may further comprise detecting when the sudden transition has occurred by detecting a sudden increase in piston velocity. The sudden increase in piston velocity may correspond to the predetermined amount referred to above.

The method may further comprise outputting said health status to an aircraft computer. In response to the health status, the aircraft computer may cease or reduce operation of the actuator, for example to avoid damage to the actuator or seal. The method may further comprise outputting said health status to a display or user interface. The actuator may have an indicator associated with it, such as a light or mechanical pointer, and the method may further comprise causing said indicator to change, for example the light to change colour or the mechanical pointer to change position, in response to the health status of the actuator or seal.

The seal may be an abradable seal and/or may be an annular seal located around a circumference of the piston, and may provide a sealing function, for example to prevent substantial fluid transfer between two chambers defined or separated by the piston.

The actuator may be used in an aircraft, for example to control one or more flight control surfaces of the aircraft.

BRIEF DESCRIPTION OF THE DRAWINGS

Various embodiments will now be described, by way of example only, and with reference to the accompanying drawings in which.

DETAILED DESCRIPTION

The present disclosure relates generally to a method or methods for monitoring the health of an abradable seal located on an actuator piston. Examples of such abradable seals will also be described, although the methods are applicable to other abradable seals not described in detail herein.

It will be appreciated that the functional steps of the methods disclosed herein may be performed by hardware, software and/or firmware components, for example, that may be configured to perform the specified steps. For the sake of conciseness, conventional techniques that are known to the person skilled in the art by way of their common general knowledge may not be described in detail herein.

The methods and apparatus described herein have applications in, for example, aerospace and in particular actuators for aircraft components. Such actuators are frequently serviced and/or inspected and the methods described herein may reduce the need for servicing and/or inspecting, especially in relation to the seals of pistons used in such actuators, which are typically difficult to inspect. However, the disclosure is generally applicable to other applications outside of the aerospace industry.

Taking the example of an actuator for use in an aircraft, such actuators may be employed to actuate flight control surfaces, such as elevators and ailerons. Typically a number of actuators will be employed for such purposes.

Figure 1:
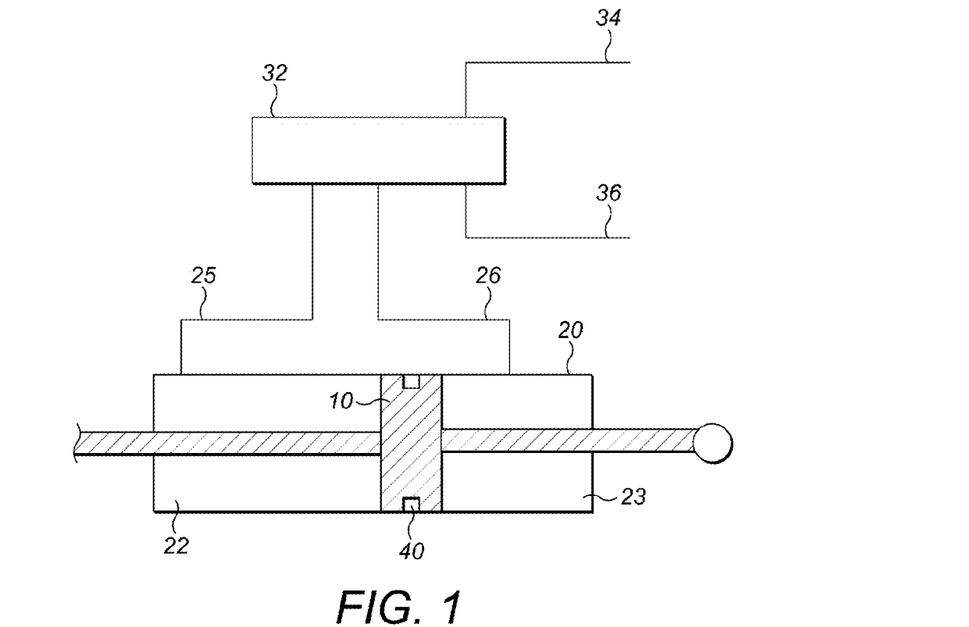
FIG. 1 shows an actuator assembly.

An actuator assembly is shown in FIG. 1 and may comprise a piston 10 and a cylinder 20 within which the piston 10 moves. The piston 10 may separate two chambers, e.g. first and second chambers 22, 23, that vary in volume depending on the position of the piston 10. The assembly may comprise an annular abradable seal 100 that provides a sealing function to prevent substantial fluid transfer between the chambers 22, 23.

The actuator assembly may comprise a hydraulic system 30 to control the flow of fluid into the chambers 22, 23. The hydraulic system 30 may comprise a valve 32, for example a servo valve, that controls the flow of fluid into the chambers 22, 23.

In order to extend the actuator, for example, the valve 32 may receive hydraulic fluid from an inlet 34, pump this into the first chamber 22 via a first line 25, which in turn forces hydraulic fluid out of the second chamber 23 to an outlet 36 via a second line 26 and valve 32. In order to retract the actuator, for example, the valve 32 may operate in reverse by receiving hydraulic fluid from the inlet 34, pumping this into the second chamber 23, which forces hydraulic fluid out of the first chamber 22 to the outlet 36 via first line 25 and valve 32.

During use the abradable seal 100 will degrade and wear. An abradable seal referred to herein may generally and in broad aspects comprise an abradable outer ring or outer ring assembly, and an energiser for urging the outer ring against an opposing surface. Once the abradable outer ring is worn away this can expose the energiser to the opposing surface, which may act as a seal for a short period of time before the seal fails and the actuator may be no longer operational. An example of such an abradable seal is described in more detail below. Other types or configurations of abradable seal are possible and equally applicable to the methods disclosed herein.

A computer, for example an aircraft computer or Flight Control Computer ("FCC"), may be configured to measure or monitor the velocity or speed of the piston during use.

The present disclosure may relate to monitoring the piston speed in order to determine the leakage across the piston, or flow between the chambers 22, 23 at a particular point in time. This can enable the seal condition to be monitored throughout its life, since it may not be possible to monitor flow or leakage across the seal directly in use.

The relationship between piston speed, v, piston section or area, S, and the present or instantaneous flow of the actuator, $Q_a$ may be:

$$v = \frac{Q_a}{S} \quad (1)$$

where $Q_a$ can be made up of piston flow, $Q_p$ (i.e. the flow caused by the piston head in, for example, cubic cm per minute) and leakage flow, $Q_l$ across the seal, such that:

$$Q_a = Q_p + Q_l \quad (2)$$

Therefore, piston speed and the internal leakage or flow across the seal may be directly correlated. As such, by monitoring piston speed it can be possible to monitor the internal leakage of the abradable seal 100. The actuator can be set up in a passive state to keep the other variables constant. For example, the control valve 32 may be set into a null position ($Q_p=0$) such that, for example, there is no additional flow into the chambers 22, 23. The load on the actuator can be set to be the passive mass of the component that the actuator is connected to, or it may be (somehow) released from the component. The actuator can be set to be at its extension stop (e.g. to the extreme left or right in FIG. 1). It is possible to set the actuator up with some or all of these conditions at any point in its life cycle.

A passive state or condition as disclosed herein may be one in which the flow of fluid in the actuator is caused by leakage flow across the abradable seal (e.g. $Q_p=0$). As such, any movement experienced by the piston may be due only to the leakage flow across the seal.

In accordance with the disclosure, therefore, the actuator can be periodically set up in a passive state and the piston speed may be measured, so as to monitor the internal leakage across the abradable seal over time. This can give an efficient and accurate indication of the internal leakage throughout the life cycle of the seal. Moreover, once the piston speed increases above a predetermined amount then a health status, for example a warning can be outputted, and/or recorded by a computer, for example an aircraft computer or FCC.

This method can have advantages over methods that monitor, for example, valve travel since it may focus specifically on the leakage across the abradable seal 100. In other words, the only variable that may change when setting up the actuator in its passive state may be the leakage flow across the seal, as discussed above. Leakage variations in respect of the control valve 32, for example, may not affect the health status of the abradable seal 100. As such, the method of the present disclosure may give a specific health status of leakage across the abradable seal 100, that may not be affected by other leakage within the actuator.

Figure 2:
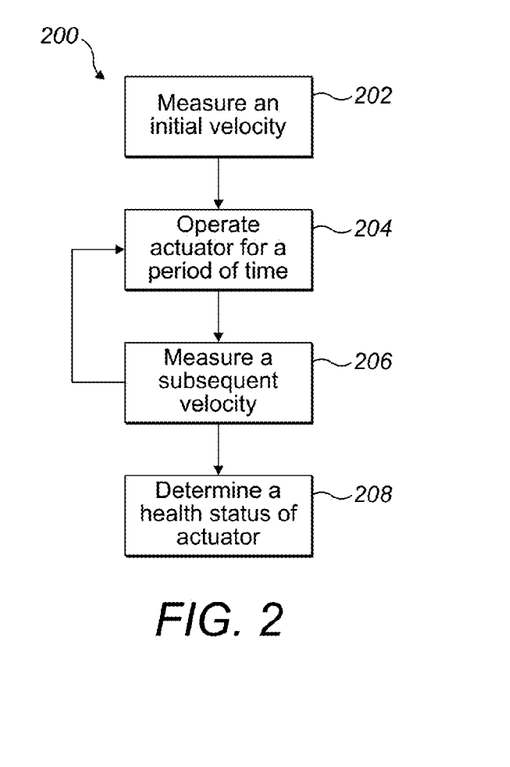
FIG. 2 is an illustration showing a method in accordance with the present disclosure.

FIG. 2 is an illustration of the process 200 according to the disclosure. Process 200 may begin by measuring an initial velocity of the actuator piston while the actuator is optionally maintained in a passive state or condition at an initial time (step 202).

The actuator may then be operated for a period of time (step 204). At a subsequent time, a subsequent velocity of the actuator piston may be measured, again while the actuator is optionally maintained in a passive condition (step 206).

Steps 204 and 206 may be repeated and the measured subsequent velocities may be recorded over a predetermined period of time, and/or a health status of the actuator may be determined, for example when the subsequent velocity has increased above a predetermined amount (step 208).

An example of an abradable seal 100 that may be used in the method described herein will now be described with reference to FIG. 3.

Figure 3:
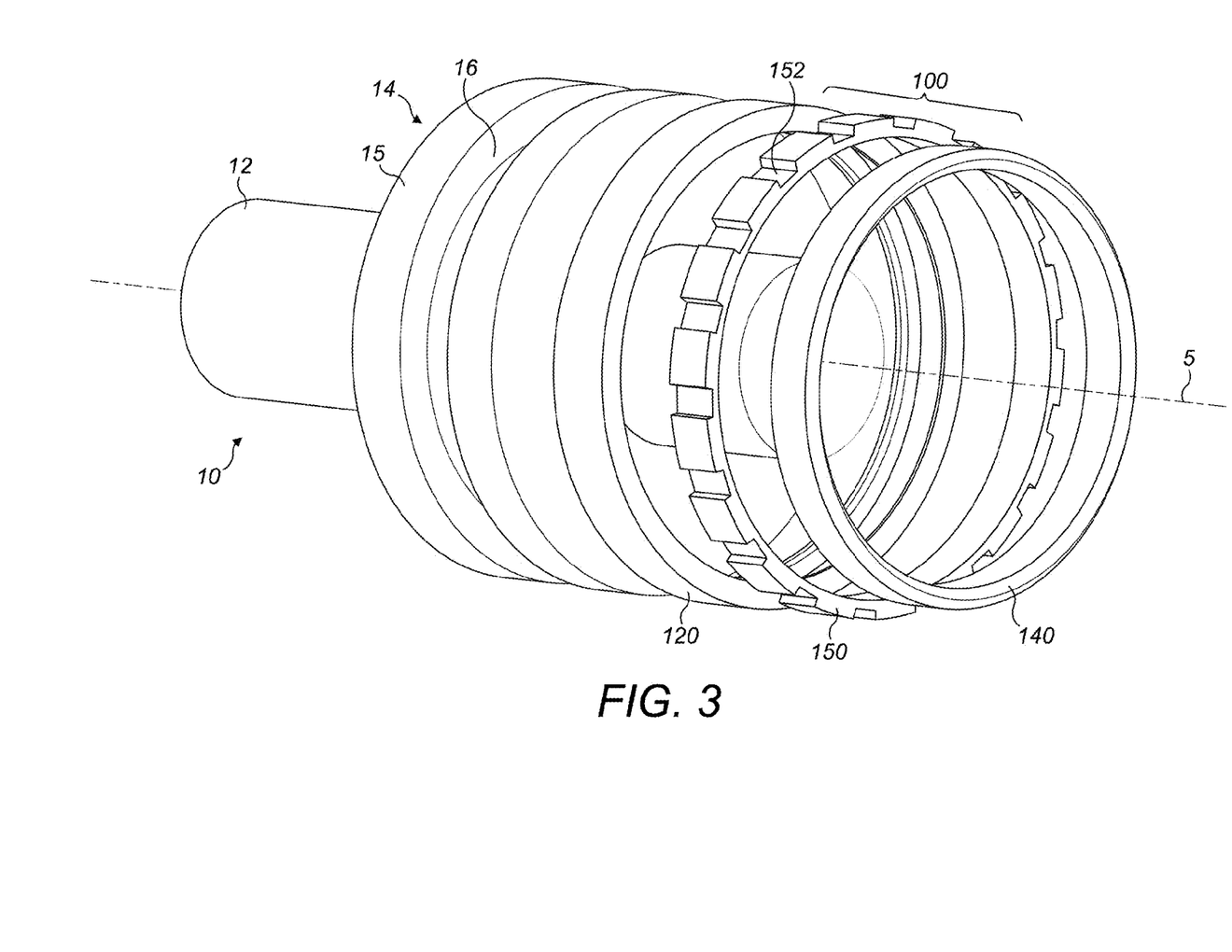
FIG. 3 shows an exploded, perspective view of an abradable seal.
Figure 5:
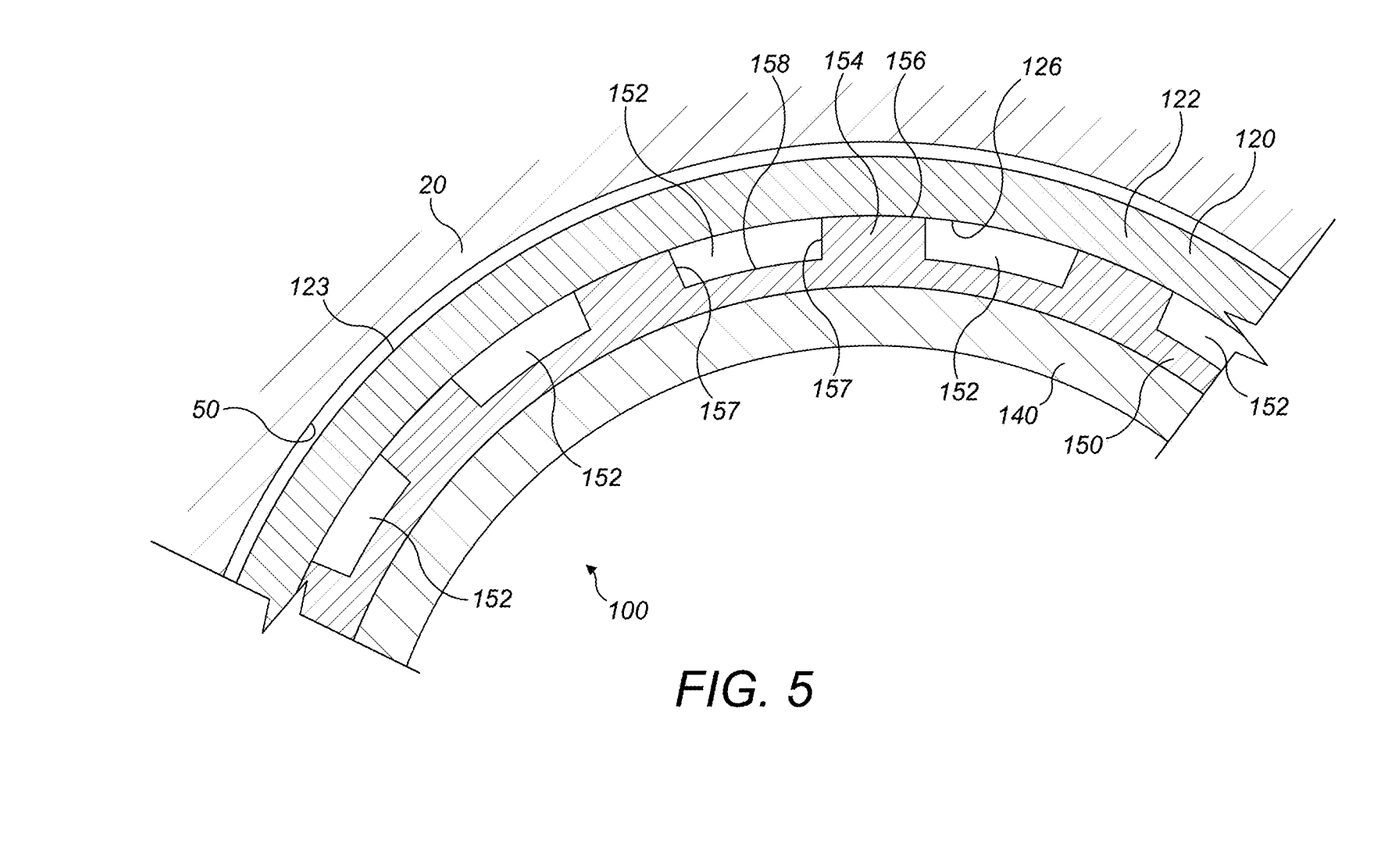
FIG. 5 shows a circumferential cross-section of the abradable seal of FIG. 1.

FIG. 3 shows the piston 10 that is arranged to move axially inside the cylinder 20 (shown in FIGS. 1 and 5). The piston 10 comprises a shaft 12, wherein the longitudinal axis 5 of the shaft 12 forms the axis of movement of the piston 10. The piston 10 further comprises a flange 14 that extends radially from the shaft 12 to form a concentric disc extending towards the inner surface 50 of the cylinder 20 within which the piston 10 moves. The flange 14 comprises an outer peripheral surface 15 arranged to face the inner surface 50 of the cylinder and having a circumferential groove 16 therein.

The abradable seal 100 (or abradable seal assembly) is configured to sit within the groove 16 to provide a sealing function between the piston 10 and the inner surface 50 of the cylinder 20. It should be noted that FIG. 3 shows an exploded view such that the abradable seal 100 is not shown within the groove 16 so that its components can be clearly seen. The abradable seal 100 is known as a dynamic seal, in that it provides a sealing function between two or more parts that move relative to each other. In this case the parts comprise the piston 10 and the cylinder 20, wherein the piston 10 moves within the stationary cylinder 20. Thus, the inner surface 50 of the cylinder 20 can otherwise be referred to as the opposing surface 50 of the abradable seal 100.

It is envisaged that the abradable seal 100 could also be provided in a groove that is within the inner surface 50 of the cylinder 20, whilst having the same features as described herein in relation to the abradable seal 100 being within the flange 14 of the piston 10. In this case, the outer peripheral surface 15 of the flange may be flat (i.e. may comprise substantially no grooves) and could form the opposing surface 50 of the abradable seal 100. However, the piston 10 could only move a distance less than the axial length of the outer circumferential surface 15.

The abradable seal 100 comprises an abradable outer ring 120 that is arranged to contact the opposing surface 50 in use to form a seal between the piston 10 and the opposing surface 50. The outer ring 120 is designed to wear (or abrade) during use due to friction between the outer ring 120 and the opposing surface 50 caused by the piston 10 moving within the cylinder.

The abradable seal further comprises an energiser 140 for urging the abradable outer ring 120 away from the peripheral surface 15 of the flange 14 and against the opposing surface 50. The energiser 140 may be a compressible material, for example an elastomer. Alternatively, the energiser 140 may be a spring, for example a metallic coil or wave spring. The outer ring 120 may be compressed when the piston 10 is initially placed within the cylinder, and act to urge the outer ring 120 away from the peripheral surface 15 of the flange 14 once it is suitably placed.

Figure 4:
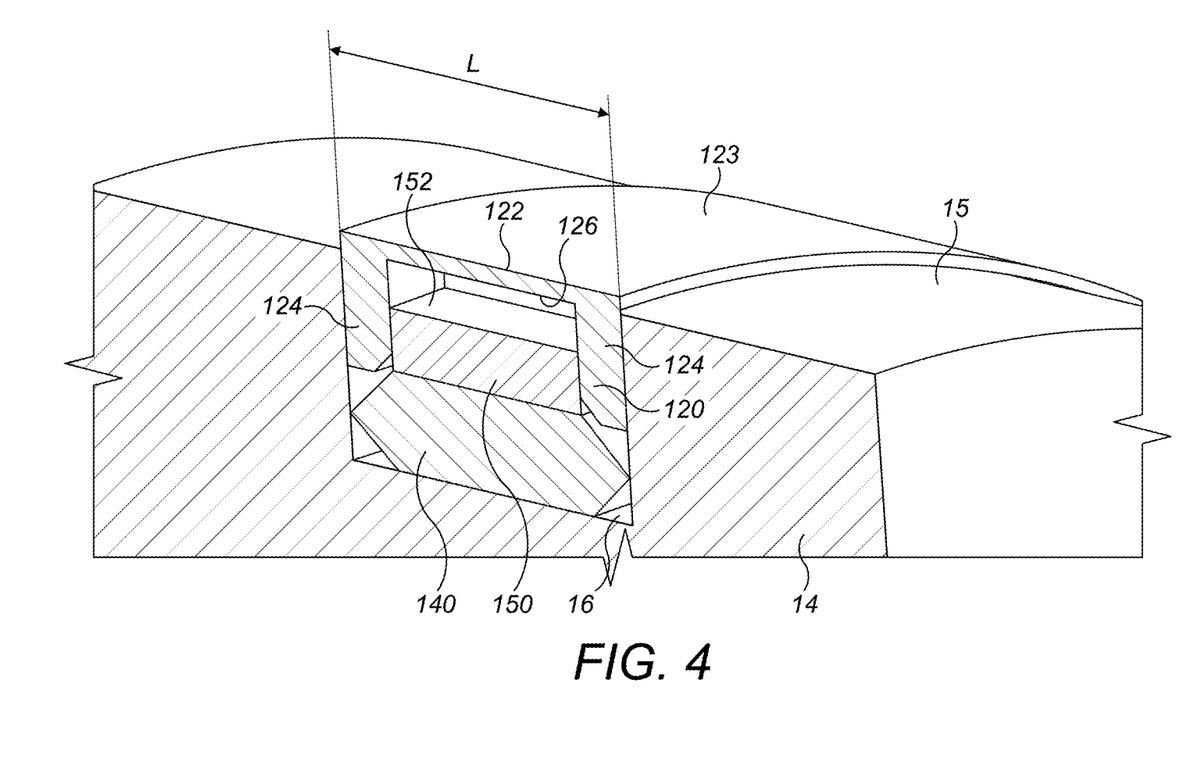
FIG. 4 shows an axial cross-section through the abradable seal of FIG. 3.
Figure 6:
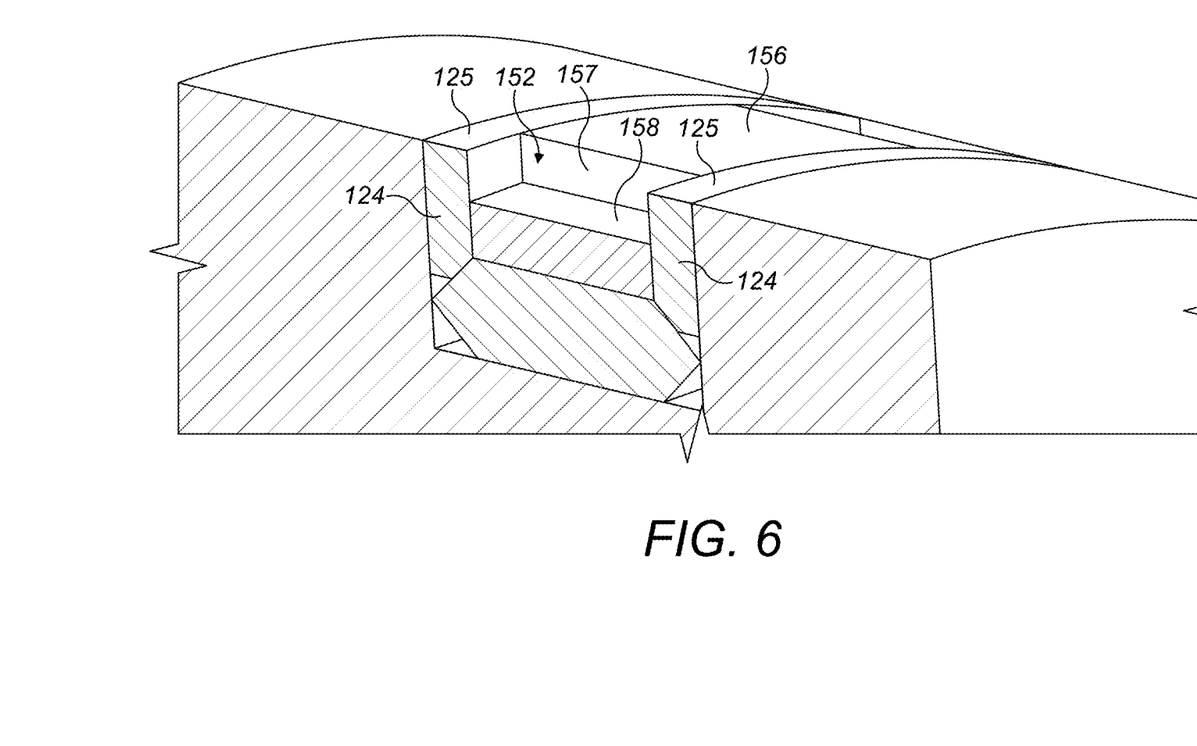
FIG. 6 shows an axial cross-section through the abradable seal of FIG. 1, once the seal has been worn in use.

In accordance with the disclosure, the abradable seal 100 further comprises an ancillary ring 150 that is located radially inward from the outer ring 120, which is shown in more detail in FIGS. 4, 5 and 6.

FIG. 4 shows an axial cross-section of the flange 14 and the abradable seal 100, including the outer ring 120, energiser 140 and ancillary ring 150. The outer ring 120 comprises a base or outermost portion 122 extending axially to provide an initial or normal sealing surface 123, and two side portions 124 that extend radially inward from axial ends of the base portion 122. The base portion 122, and thus the sealing surface 123, have an axial length L. Thus, initially and during normal operation (defined below) the outer ring 120 has a U-shaped axial cross-section, which is uniform throughout its circumference.

The ancillary ring 150 sits within the U-shape of the outer ring 120, and between the energiser 140 and the outer ring 120. The ancillary ring 150 comprises a number of apertures 152 in its outer circumference (see also FIG. 5), such that the ancillary ring 150 has a non-uniform axial cross-section throughout its circumference. In alternative arrangements the outer ring 120 and the ancillary ring 150 may be formed by the same component. The outer ring 120 and the ancillary ring 150 may be referred to as an outer ring arrangement.

FIG. 5 shows a circumferential cross-section of the abradable seal 100 through the circumferential groove 16, from which the apertures 152 in the ancillary ring 150 can be seen in more detail. In the illustrated embodiment, the apertures 152 are of uniform dimensions and are spaced apart at equal intervals in the outer circumference of the ancillary ring 150. A plurality of projections 154 are formed in the outer circumference of the ancillary ring 150 due to the apertures 152. Initially and during normal operation an outer surface 156 of the projections 154 contacts an inner circumferential surface 126 of the base portion 122 of the outer ring 120. The outer surface 156 is urged against the inner circumferential surface 126 by the energiser 140.

The apertures 152 comprise side walls 157 and a base surface 158 and may be formed by machining the outer circumference of the ancillary ring 150.

It can be seen that, in the illustrated embodiment of FIG. 4 and during normal operation, the apertures 152 of the ancillary ring 150 result in a plurality of chambers being formed that are enclosed by the base portion 123 and side portions 124 of the outer ring 120, as well as the side walls 157 and base surface 158 of the ancillary ring 150. Thus, each chamber 153 represents a void in the outer ring arrangement, which in the illustrated embodiment comprises the outer ring 120 and the ancillary ring 150.

Initially and during normal operation, therefore, the abradable seal 100 will function by the energiser urging the outer ring 120 against the opposing surface 50, via the ancillary ring 150. The sealing surface 123 of the outer ring 120 is urged against the opposing surface 50 and provides a uniform circumferential sealing surface.

Normal operation as defined herein corresponds to the period of time in which the initial or normal sealing surface 123 and/or base portion 122 wears down but is not worn away. The initial or normal sealing surface area is the area of the sealing surface 123 during initial set up or normal operation respectively. Since no voids, apertures etc. are present in the initial or normal sealing surface area, this area is calculated as the axial length L of the sealing surface 123 multiplied by the initial or immediate circumference of the outer ring 120. During normal operation, therefore, the initial or normal sealing surface 123 has a constant or substantially constant surface area, known herein as a first, initial or normal sealing surface area.

In use, the normal sealing surface 123 will wear down due to friction between the sealing surface 123 and the opposing surface 50. As described above the surface area of the normal sealing surface 123 remains substantially constant whilst the base portion 122 exists during normal operation (i.e. is not worn away). That is, except for a minimal or negligible reduction in surface area due to the thickness of the seal wearing away (reducing the diameter of the seal and circumference), the first sealing surface area remains constant.

FIG. 6 shows a transition point during operation of the piston 10, in which the base portion 122 and sealing surface 123 have just worn away. This exposes the chambers referred to above, by removing their outer surface, which was formed by the now-absent base portion 122.

Since the normal sealing surface 123 is no longer present, the abradable seal 100 is no longer in normal operation. Abnormal operation may be defined herein as any operation of the seal 100 other than normal operation, or may be defined as operation of the seal 100 once the normal sealing surface 123 is worn away.

In the illustrated case abnormal operation occurs once the normal sealing surface 123 wears away. At this point the sealing surface of the abradable seal 100 of FIG. 6 is formed by the upper surfaces 125 of the two remaining side portions 124 of the outer ring 120, as well as the outer surface 156 of the projections 154. The sealing surface in abnormal operation has a second sealing surface area that, due to the presence of apertures 152, is smaller than the first sealing surface area.

Referring back to FIGS. 1 and 3, it will be appreciated that the piston 10 separates two chambers 22, 23 which are located either side of the flange 14, and the abradable seal 100 is configured to prevent fluid transfer between the chambers 22, 23 as the piston 10 moves back and forth along the longitudinal axis 5 of the shaft 12.

Typically, however, leakage exists between the two chambers 22, 23 and the amount of leakage is dependent in part on the surface area of the sealing surface. Leakage between chambers 22, 23 may be referred to as "internal leakage". Internal leakage and sealing surface area generally have a negative correlation with respect to each other.

In this embodiment, there is provided a measured, controlled or predetermined and sudden increase in internal leakage during operation of the seal, namely at the transition between normal and abnormal operation. In the illustrated embodiment, this is achieved through a sudden reduction in the surface area of the abradable seal 100 at the transition between normal and abnormal operation. It should be noted that the outer ring arrangement still comprises a sealing surface or sealing surface area during abnormal operation, as described above. This means that, whilst the seal may not be fully operational, the transition between normal and abnormal operation does not cause catastrophic failure or damage to the seal.

In the illustrated embodiment, use of the apertures 152 in the ancillary ring 150 results in a sudden or immediate drop in sealing surface area, during or immediately after the transition from normal to abnormal operation. An operator could monitor or otherwise observe this drop in internal leakage at the transition from normal to abnormal operation, and immediately determine that the seal has failed.

As discussed, however, the outer ring arrangement still provides a sealing function during the transition from normal to abnormal operation, in that the side portions 124 and outer surface 156 of the outer ring arrangement provide a sealing surface. This allows the exact point at which the seal fails (or requires replacing) to be determined but without also causing damage to the seal 10, piston 10, cylinder 50 or other hydraulic parts associated with the seal 100.

The flow between the chambers during normal operation may be represented by the following equation:

$$Q_l = K(\text{oil}) \times \frac{j^3}{L} \times \Delta P \qquad (1)$$

where $Q_l$ represents the internal leakage or flow between chambers of the piston, K represents the frictional coefficient of the oil, j represents the amount of radial movement of the seal, L is the axial length of the sealing surface (see L in FIG. 2) and $\Delta P$ is the pressure difference between the chambers. As is evident, the internal leakage has a negative correlation with the sealing surface area. This is represented by a length in equation (1) since the sealing surface in normal operation is uniform and continuous throughout its circumference.

Once the base portion 122 of the outer ring 120 is worn away, the internal leakage between the chambers suddenly increases, and the pressure difference suddenly decreases, due to the smaller surface area of the second sealing surface. The seal will still function, due to the remaining parts of the outer ring 120 (i.e. the side portions 124) and the ancillary ring 150. However, the flow between the chambers during abnormal operation may now be defined by the following relationship:

$$Q_a \approx (1-\alpha)\frac{K(\text{oil})j^3}{L}\Delta P + \alpha\frac{K(\text{oil})j^3}{2L_B}\Delta P = \left[1 + \alpha\left(\frac{L}{2L_B} - 1\right)\right]Q_n \quad (2)$$

where $$\alpha = \frac{ne}{\pi D} \quad (3)$$

and where Q represents the flow between the chambers, $Q_n$ represents the flow during normal operation (see (1)), j represents the amount of radial movement of the seal, $\Delta P$ is the pressure difference between the chambers, L is the axial length of the sealing surface (as in (1)), $L_B$ is the axial length of the ancillary ring 150, n is the number of apertures 152 and e is the circumferential length of the apertures 152.

Equations (1) and (2) show that there will be a clear difference in the measured flow or pressure between the chambers separated by the abradable seal 100.

An abradable seal 100 according to the above-described embodiment may be used in many applications. In particular, the above abradable seal 100 may be used in an aircraft hydraulic actuator. The piston 10 as described above may be used to actuate a specific aircraft component, for example a flap or rudder.

Whilst a flight control computer ("FCC") may monitor internal leakage or pressure, it is not possible in conventional aircraft actuators to detect failure of the seal, other than to operate the seal until catastrophic failure. This is clearly undesirable, and means that most seals have to be manually inspected and usually replaced before the end of their service life. Using an abradable seal 100 according to the present disclosure allows an operator to detect failure of the seal in, for example, a pre-flight check, by monitoring internal leakage or a pressure drop in the actuator using, for example, a flight control computer. This reduces the need for manual inspections and allows the seal to be used to the full extent of its service life.

The present disclosure allows an instant discovery of the transition between normal and abnormal operation.

Although the present disclosure has been described with reference to the embodiments described above, it will be understood by those skilled in the art that various changes in form and detail may be made.

For example, in its broadest aspects the abradable seal of the present disclosure may have uses in any application where it would be beneficial to detect certain points in the service life of the seal without having to manually inspect it. For example, a plurality of sudden reductions in the surface area of the sealing surface could be provided, corresponding to 50%, 20%, 10% etc. of the remaining service life of the seal. This is beneficial for certain seals which, for example, may be embedded in pumping equipment and could be very difficult to inspect.

The invention claimed is:

1. A method of monitoring the health of an abradable seal located on a piston of an actuator, the method comprising the steps of:
   (i) measuring an initial velocity of said actuator piston while said actuator is maintained in a passive state or condition;
   (ii) after the completion of step (i) operating said actuator for a period of time;
   (iii) after the completion of step (ii) measuring a subsequent velocity of said actuator piston while said actuator is maintained in a passive state or condition;
   (iv) repeating steps (i)-(iii) at least once and recording or outputting the measured subsequent velocities over time; and
   (v) determining a health status of said abradable seal when said subsequent velocity has increased above a predetermined amount.

2. The method as claimed in claim 1, wherein step (i) and/or (iii) comprises setting up said actuator in the passive state or condition prior to measuring said initial velocity.

3. The method as claimed in claim 2, wherein said actuator comprises a control valve, and said step of setting up said actuator in the passive state or condition comprises setting said control valve into its null position such that there is no flow of fluid into or out of said actuator and movement of said piston is primarily caused by flow of fluid across the abradable seal.

4. The method as claimed in claim 2, wherein said step of setting up said actuator in the passive state or condition comprises moving said piston to its farthest or closest extension.

5. The method as claimed in claim 1, wherein measuring said initial or subsequent velocity comprises the steps of:
   (a) moving said piston to a first position;
   (b) setting up said actuator in the passive state or condition after moving said piston to said first position;
   (c) measuring the distance moved by the piston in a given time after setting up said actuator in the passive state or position; And
   (d) calculating said initial or subsequent piston velocity using the measured distance divided by the given time.

6. The A method as claimed in claim 5, wherein measuring said initial or subsequent velocity further comprises the step of:
   (e) releasing said actuator from its passive state or condition after calculating said initial or subsequent piston velocity.

7. The method as claimed in claim 1, wherein said actuator is a hydraulic actuator and comprises a control valve arranged and configured to control the distribution of hydraulic fluid in said actuator.

8. The method as claimed in claim 7, wherein said passive state or condition is defined as operation of said actuator with said control valve set in a passive, or null condition such that hydraulic fluid is not introduced into said actuator.

9. The method as claimed in claim 1, wherein said step of determining the health status of said abradable seal comprises determining that internal leakage has increased above a critical amount based on said increase in the velocity of said piston.

10. The method as claimed in claim 1, where said abradable seal is an annular seal located around a circumference of said piston, and provides a sealing function to prevent substantial fluid transfer between two chambers defined or separated by said piston.

11. The method as claimed in claim 1, wherein said actuator is used in an aircraft.

12. The method as claimed in claim 11, wherein said actuator controls one or more flight control surfaces of said aircraft.

13. The method as claimed in claim 1, wherein said abradable seal is configured such that after a first period of operation said sealing surface suddenly transitions from having a first surface area to having a second surface area, wherein the second surface area is smaller than the first surface area, so as to cause a sudden increase in internal leakage across the seal at said transition.

14. The methods claimed in claim 13, wherein said step of determining the health status of said abradable seal comprises determining that said sudden increase in internal leakage has occurred on the basis of a sudden increase in piston velocity.

\* \* \* \* \*